(12) United States Patent
Fabrick, II et al.

(10) Patent No.: US 8,616,888 B2
(45) Date of Patent: Dec. 31, 2013

(54) DEFINING AN INSERTION INDICATOR

(75) Inventors: Richard W. Fabrick, II, Campbell, CA (US); Reginald Dean Hudson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1539 days.

(21) Appl. No.: 11/975,252

(22) Filed: Oct. 17, 2007

(65) Prior Publication Data

US 2009/0104587 A1 Apr. 23, 2009

(51) Int. Cl.
*G09B 21/00* (2006.01)

(52) U.S. Cl.
USPC .......................................................... 434/113

(58) Field of Classification Search
USPC ........ 434/113, 115, 117; 400/109, 109.1, 483
See application file for complete search history.

(56) References Cited

U.S. PATENT DOCUMENTS

| 7,029,190 B1 * | 4/2006 | Davis et al. ................... 400/483 |
| 7,556,444 B2 * | 7/2009 | Kurashina et al. .......... 400/109.1 |
| 2003/0098803 A1 * | 5/2003 | Gourgey et al. ................. 341/21 |
| 2005/0233287 A1 * | 10/2005 | Bulatov et al. ................ 434/114 |
| 2006/0193669 A1 * | 8/2006 | Takada et al. .............. 400/109.1 |

* cited by examiner

*Primary Examiner* — Kesha Frisby
(74) *Attorney, Agent, or Firm* — Blakely, Sokoloff, Taylor & Zafman LLP

(57) ABSTRACT

Methods and apparatuses to define an insertion indicator on a Braille device are described. Information about an insertion indicator at a location on a display device is received. An output associated with the insertion indicator is provided to a Braille device. The output to the Braille device reproduces the location of the insertion indicator on the display device. The output associated with the insertion indicator may be provided to at least two cells of the Braille device. The output to the Braille device may be provided to raise a first dot of a first Braille cell on the Braille device, wherein the first Braille cell corresponds to a second location that precedes the first location on the display device. A Braille caption panel may be displayed on a display device, the Braille caption panel includes a simulation of the output associated with the insertion indicator on the Braille device.

10 Claims, 16 Drawing Sheets

DEFINING AN INSERTION INDICATOR

COPYRIGHT NOTICES

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright ®2007, Apple Inc., All Rights Reserved.

FIELD OF THE INVENTION

Embodiments of the invention relate to data processing systems, and more particularly, to assisting visually impaired users to access and interact with data processing systems.

BACKGROUND

Most modern operating systems provide a rich graphical user interface (GUI) as the primary means of interacting between a user and the applications and resources of the system. GUIs, while useful to most people, impose a significant challenge to those with disabilities such as blindness, visual impairment, and gross or fine motor challenges.

An individual with a physical or visual impairment or similar disability may install and utilize accessibility software on their personal computer. Accessibility software may provide a set of tools to assist a physically or visually impaired user. The set of tools includes a screen reader that reads the text being displayed on the screen, and a navigation tool to allow a user to navigate the operating system GUI using only the keyboard, or in some cases by adapting a pointing device (e.g., mouse) input.

Typically, the screen readers, such as JAWS™ and Window Eyes™ may operate on Windows™ environment. The screen reader VoiceOver™ produced by Apple Inc., located in Cupertino, Calif. may be used for Macintosh™ environment. The screen reader may identify and interpret what is being displayed on the screen. This interpretation may be represented to the user with text-to-speech, sound icons, or a Braille output.

FIG. 1A illustrates a typical Braille device 103 having a Braille code of a text 104 displayed on a computer screen 101. As shown in FIG. 1A, an I-beam 105 positioned between letters "r" and "s" (113) of the text 104 is displayed on a computer screen 101. Generally, the I-beam is an indicator for a point (location) where an input (for example, a user input) is inserted into a text onto the computer screen. Text 104 is represented by a line of Braille code 102 on Braille device 103. Each character (e.g., a letter of a text 104) may be represented in a single Braille cell, such as a cell 107, as shown in FIG. 1A.

FIG. 1B illustrates a typical Braille cell 107. As shown in FIG. 1B, Braille cell 107 has eight pins 121-128 that may rise and fall depending on the electrical signal they may receive. Typically, upper pins 121-126 referred as Braille dots 1-6, are used to represent a character. Lower pins 127-128 referred as Braille dots 7-8, are typically used to convey additional information about a displayed text. For one example, dots 7-8 of the Braille cell may be used to indicate that the character represented by a Braille cell, is selected. For another example, dots 7-8 of a single Braille cell may be used to indicate the I-beam 105 on the screen 101.

Referring back to FIG. 1A, the raised pins are illustrated by filled circles, and the pins that are lowered are illustrated by empty circles. As shown in FIG. 1A, dot 7 (109) and dot 8 (110) of cell 107 are used to indicate I-beam 105. As shown in FIG. 1A, dots 7 and 8 belong to single cell 107 that represents a character 113 ("letter "s") that follows (immediately to the right of) I-beam 105 and denote the character 113, and does not denote the actual position of the I-beam 105. Therefore, using dots 7 and 8 of the single cell to indicate the I-beam 105 does not convey to a user with impaired vision the actual location of the I-beam 105 on the computer screen 101, as a sighted user sees. That is, the information that a user with the impaired vision receives from the Braille device 103 does not accurately describe what a sighted user sees on screen 101.

As a result, the user with impaired vision may not even be aware of the existence of the I-beam 105 on computer screen 101. Additionally, the user with impaired vision may not know where the inserted characters are going to be placed when the user starts to insert (e.g., type, and/or paste) the characters into the text. That impacts the ability of the user with the impaired vision to effectively interact with a computer system, and/or collaborate with a sighted user.

SUMMARY OF THE DESCRIPTION

Methods and apparatuses to define an insertion indicator on a Braille device are described herein. An information about an insertion indicator, for example, an insertion point, an I-beam, a text cursor, and the like, at a first location on a display device, for example, on a screen of a computer monitor may be received. An output associated with the insertion indicator is provided to a Braille device in response to receiving the information. The output to the Braille device may reproduce the first location of the insertion indicator on the display device.

In one embodiment, the output associated with the insertion indicator may be provided to at least two cells of the Braille device. A first dot of a first Braille cell on the Braille device may be raised. The first Braille cell on the Braille device corresponds to a second location that precedes the first location on the display device. In one embodiment, a second dot of a second Braille cell on the Braille device may be raised. In one embodiment, a Braille caption panel may be displayed on a display device, the Braille caption panel includes a simulation of the output to the Braille device associated with the insertion indicator.

In at least some embodiments, an insertion indicator is selected at a first location on a display device. An output associated with the insertion indicator may be provided to a first Braille cell on the Braille device. The first Braille cell may correspond to a second location on the display device that precedes the first location on the display device. The output associated with the insertion indicator may be provided to a second Braille cell on the Braille device. The second Braille cell may correspond to a third location on the display device that follows the first location on the display device.

In at least some embodiments, a Braille caption panel that includes a simulation of a dot of a first Braille cell associated with the insertion indicator is displayed on the display device. The simulation of the dot of the second Braille cell associated with the insertion indicator may be displayed on the display device.

In at least some embodiments, the insertion indicator is moved to a third location on the display device. The output associated with the third location of the insertion indicator may be provided to a third Braille cell on the Braille device.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1A:
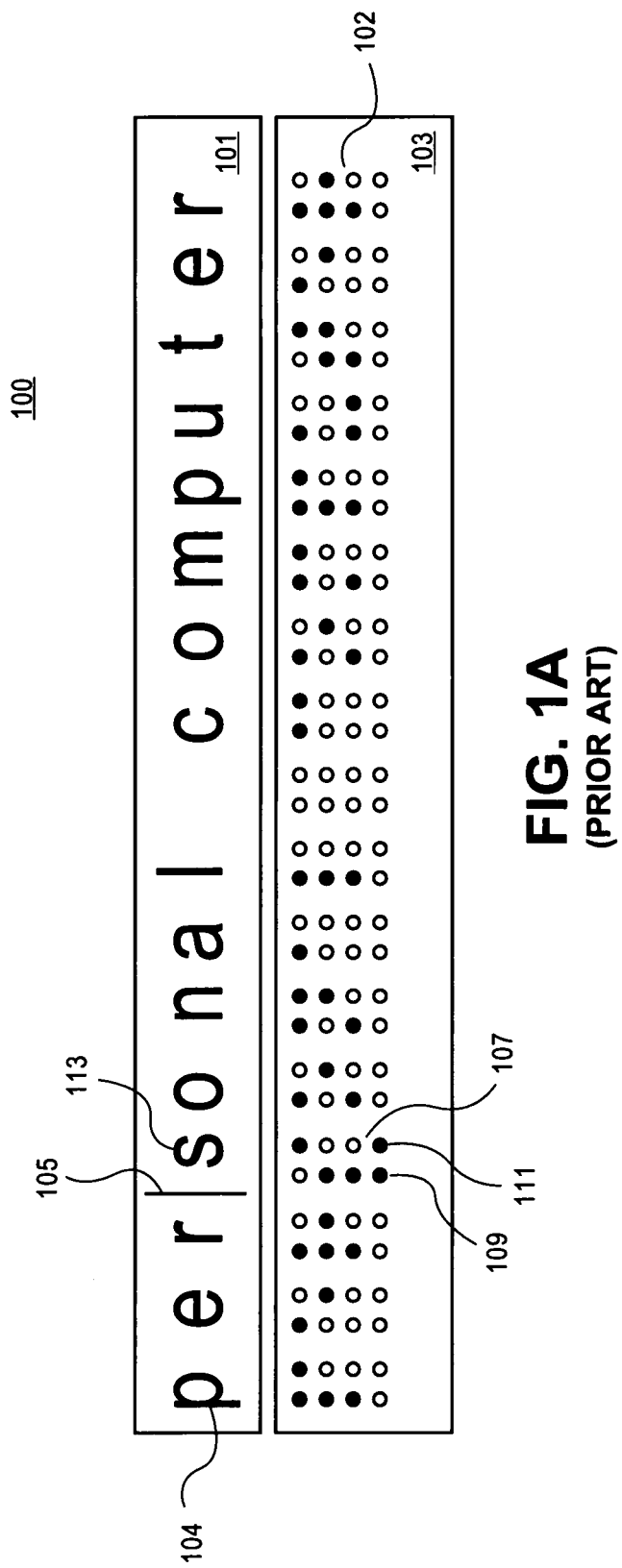
FIG. 1A illustrates a typical Braille device having a Braille code of a text displayed on a computer screen.
Figure 1B:
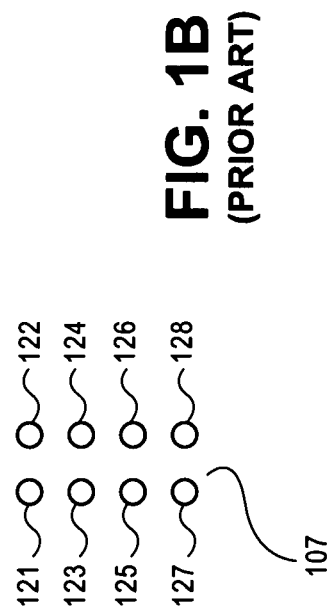
FIG. 1B illustrates a typical Braille cell.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g., computer) readable storage medium, such as, but is not limited to, any type of disk, including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of media.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below.

In addition, embodiments of the present invention are not described with reference to any particular programming language. It will be appreciated that a variety of programming languages may be used to implement the teachings of embodiments of the invention as described herein.

Figure 2:
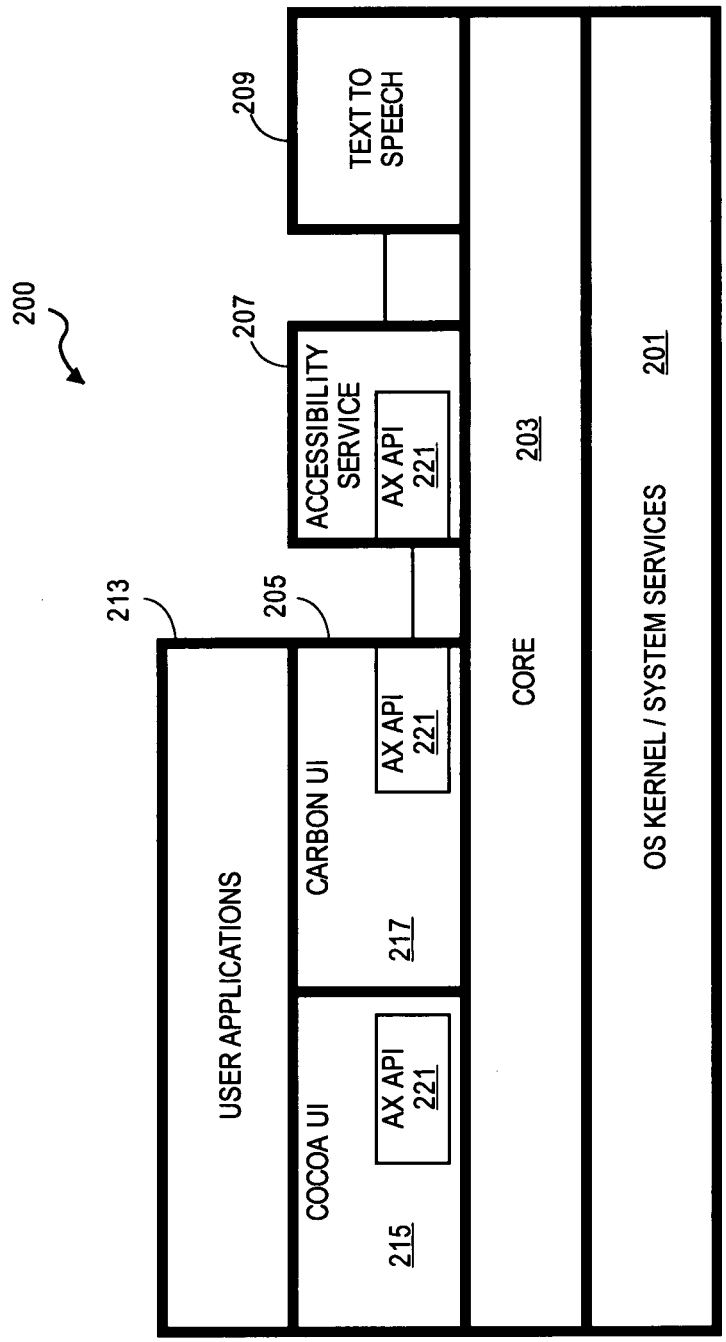
FIG. 2 is a diagram of one embodiment of the software architecture for a computer system that defines an insertion indicator on a Braille device.

FIG. 2 is a diagram of one embodiment of the software architecture for a computer system that defines an insertion indicator on a Braille device. In one embodiment, the software architecture 200 may be executed by a general computer system such as a home desktop system, office workstation or similar computer system. In one embodiment, the software architecture 200 may include multiple architectural 'layers' including a core operating system and system services layer or 'kernel' layer 201, a core layer 203, user interface layer 205, user application layer 213 or similar architectural layers or components. In one embodiment, an accessibility service 207 and text-to-speech program 209 may be at the same layer or level as the user interface layer 205.

In one embodiment, the kernel layer 201 may be responsible for general management of system resources and processing time. The kernel 201 may schedule programs for execution, manage memory, service interrupts and perform similar core system tasks. In one embodiment, the core layer 203 may provide a set of interfaces, programs and services for use by the kernel 201, user interface layer 205 including accessibility service 207 and text-to-speech program 209 and user applications 213.

In one embodiment, the user interface layer 205 may include advanced programmer interfaces (APIs), services and programs to support user applications 213 and the operating system user interface. In one embodiment, the operating system may be the Mac OS X operating system by Apple Inc. The user interface layer 205 may include the Cocoa user interface (UI) 215 and Carbon UI 217. The Cocoa UI 215 provides a set of object oriented classes, APIs and similar resources to support the development of user applications and the user application environment. The Carbon UI 217 provides a set of procedural programs, utilities and APIs to support the development of user applications and the user application environment. Each user interface layer 205 component may include an accessibility API (AX API) 221 providing a set of classes, programs or utilities that facilitate the use of applications and the operating system by individuals with visual and physical impairments. Each AX API 221 may provide a set of classes, programs or utilities appropriate to the user interface layer in which it is placed. As used herein, the accessibility services are 'integrated' with the operating system by implementation of the AX API 221 at the user interface layer or similar layer of the operating system.

In one embodiment, the accessibility service 207 may provide a set of utilities, tools and classes that support a set of integrated accessibility features. The accessibility service 207 may provide support for an accessibility cursor navigation tool, audible interface, a Braille device, and similar features for use by individuals with visual and physical impairments. The accessibility cursor and audible interface are described in greater detail in a co-pending U.S. patent application Ser. No. 10/956,720, filed Oct. 1, 2004, which is entitled "Spoken Interfaces" and which is owned by the assignee of the instant inventions. The Braille support is described in greater detail in a co-pending U.S. patent application Ser. No. 11/760,758, filed Jun. 9, 2007, which is entitled "Improved Braille Support" and which is owned by the assignee of the instant inventions. These applications are incorporated herein by reference in their entirety.

In one embodiment, a separate text-to-speech module or program may also be present to convert text descriptions of programs, text in fields of programs and similar text into audible speech at the direction of the accessibility service 207. The audible interface and text-to-speech features may generate part of the accessibility presentation for a user. An accessibility presentation as used herein includes all non-standard user interface tools that assist an impaired user including audible output magnification, Braille output and similar output types.

In one embodiment, the user application layer 213 may be an environment and set of user applications that are directly utilized by a user. Input into the computer system may be provided by a user that is intended to control and interact with the user applications. User applications may be installed on the computer system by a user. User applications may include word processing applications, spreadsheet applications, video games, email programs, Internet browsers and similar applications. In one embodiment, the user applications that adopt the AX API are completely accessible by the accessibility service 207. User applications that do not adopt the AX API may provide reduced or minimal compatibility with the accessibility service 207.

Figure 3:
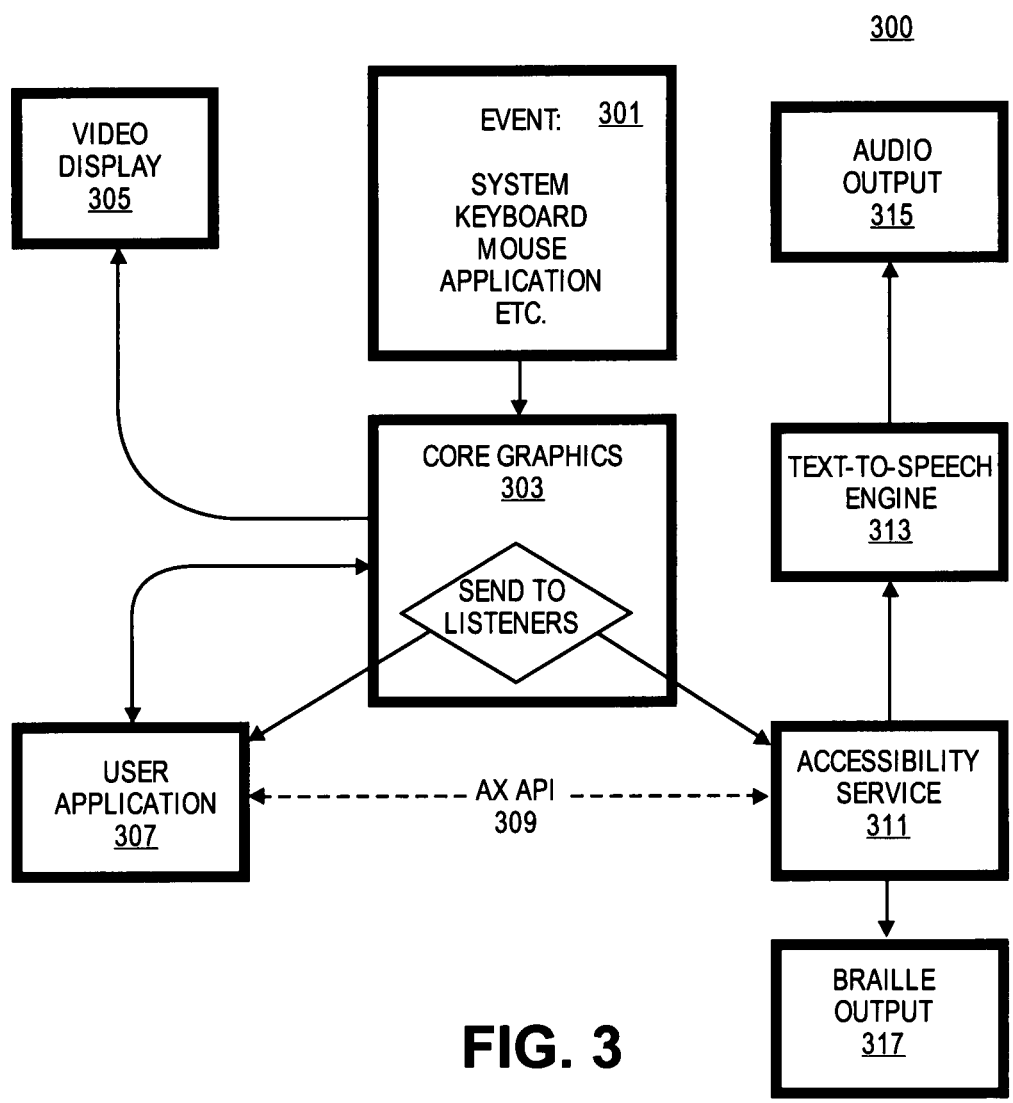
FIG. 3 is a flowchart of one embodiment of the function of the enhanced accessibility service in the computer system that defines an insertion indicator on a Braille device.

FIG. 3 is a flowchart 300 of one embodiment of the function of the enhanced accessibility service in the computer system that defines an insertion indicator on a Braille device. In one embodiment, the function of the accessibility service in the computer system is initiated by a system event (block 301). A system event may be an input received from a user through an input device such as a keyboard, mouse, or similar input device. A system event may also be generated by the operating system or computer system, such as a timer, interrupt or similar system event. A user application or similar user program may also generate an event to initiate the enhanced accessibility service.

In one embodiment, the system event may be passed to core graphics system. The core graphics system may be responsible for managing the graphical user interface (GUI). The core graphics system may generate a signal to display the user interface on a video display at the direction of a user application or an accessibility service. The core graphics system or similar aspect of the operating system may determine the programs that are related to the system event and forward the system event to each of these programs or operating system components or similar system components.

In one embodiment, the system event may be forwarded by the core graphics system (block 303) to both a user application (block 307) and to an accessibility service (block 311). The user application (block 307) may respond to the input including the generation of requests to the core graphics system (block 303) to update the video display (block 305). For example, a user typing to a word processing application may generate a keyboard event for each key depressed. The keyboard event may be passed to the word processor, which is a user application. The user application then requests (block 307) that the core graphics system update the video display (block 303) to reflect the changes input by the user. In this example, the word processor may request that the input letters be displayed on the video display.

In one embodiment, the accessibility service receives the system event at approximately the same time as a user application or similar programs. The accessibility service (block 311) analyzes the system event (block 301) to determine any changes to the user interface and user application (block 307) that may occur as a result of the system event (block 301). For example, if a mouse movement event is received the accessibility service may check to determine which user interface items are now being pointed to by a mouse cursor or accessibility cursor. The accessibility service may query the user application or similar program or component that received the same system event using the AX API (block 309) to determine what changes may have been made by the system event or to retrieve data related to the system event or a change in status for the user interface. For example, an accessibility cursor may be pointed at a word processor. As new characters are typed they are displayed through the interface. These additional letters may be gathered by the accessibility service as well as displayed by the user application for further processing to enhance accessibility (e.g., text-to-speech feedback). If a user provides input relating to navigation or program operation, the application would respond and the accessibility service would monitor to determine if an enhanced accessibility should be applied.

In one embodiment, if the accessibility service determines that the user interface data has changed or an element has been selected then related text or similar data may be passed to a text-to-speech engine 313 and/or a Braille output 317. Text-to-speech engine 313 may convert text or similar input data into an audio signal that may be output to an audio output port. The audio output may be connected with a speaker system or similar device to produce the audible feedback (block 315). Braille output 317 may convert text or similar input data into a Braille code that may be output to a Braille device (not shown). For example, the typed letters received by a word processor may each be announced as they are typed or converted to the Braille code. In another embodiment, the accessibility program may provide other utilities to a user based on gathered input data and status. Additional utilities include augmenting audible text-to-speech feedback with contextual information, navigation information and similar information. For example, a user input that changes the current active window may generate audible feedback describing the new window selected. In one embodiment, the additional utilities provided may include additional navigation options such as slider adjustment assistance that allows a user to input a value to set a scroll bar position in a slider for a window or similar interface, an augmented audible or visual navigation menu providing special navigation options and similar augmented services.

In one embodiment, the accessibility services may allow a user to specify the amount of audible, Braille or other output information provided by the accessibility presentation to a user. The accessibility service may provide an interface to set a 'chattiness' level. A low chattiness level may restrict the feedback information to minimal context information, to only return specifically selected data or similar minimal feedback. A high chattiness level may prompt the accessibility service to provide a verbose description of the context of an accessibility cursor or similar information.

Figure 4:
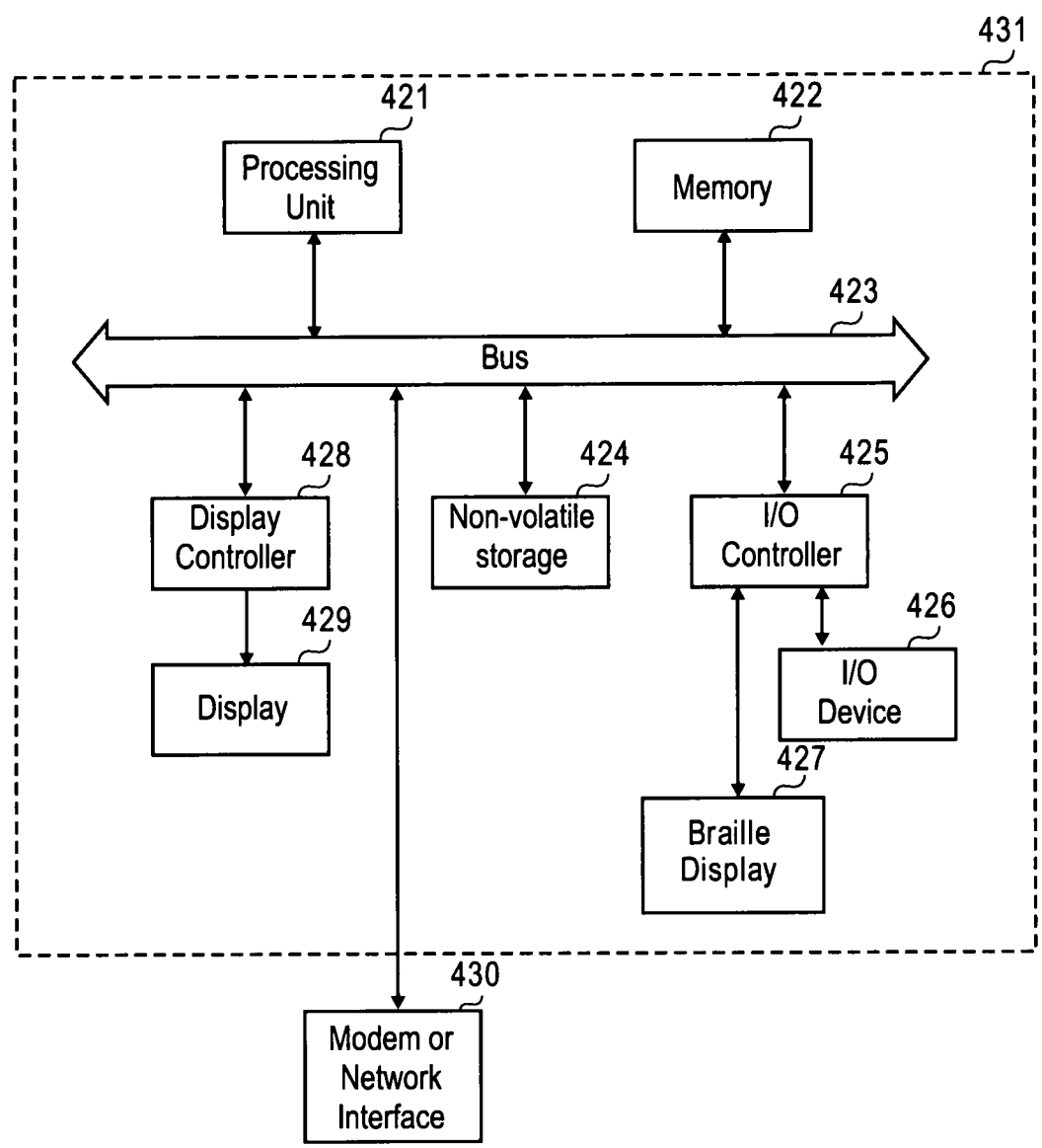
FIG. 4 shows one embodiment of a computer system to define an insertion indicator on a Braille device.

FIG. 4 shows one embodiment of a computer system 400 to define an insertion indicator on a Braille device, as described in further detail below with respect to FIGS. 5-16. A computer system 431 can interface to external systems through the modem or network interface 430, as shown in FIG. 4. It will be appreciated that the modem or network interface 430 can be considered to be part of the computer system 431. This interface 430 can be an analog modem, ISDN modem, cable modem, token ring interface, satellite transmission interface, or other interfaces for coupling a computer system to other computer systems.

Computer system 431 includes a processing unit 421 that may include a microprocessor, such as an Intel Pentium® microprocessor, Motorola Power PC® microprocessor, Intel Core™ Duo processor, AMD Athlon™ processor, AMD Turion™ processor, AMD Sempron™ processor, and any other microprocessor. Processing unit 421 may include a personal computer (PC), such as a Macintosh® (from Apple Inc. of Cupertino, Calif.), Windows®-based PC (from Microsoft Corporation of Redmond, Wash.), or one of a wide variety of hardware platforms that run the UNIX operating system or other operating systems. For one embodiment, processing unit 421 includes a general purpose computer system based on the PowerPC®, Intel Core™ Duo, AMD Athlon™, AMD Turion™ processor, AMD Sempron™, HP Pavilion™ PC, HP Compaq™ PC, and any other processor families. Processing unit 421 may be a conventional microprocessor such as an Intel Pentium microprocessor or Motorola Power PC microprocessor.

As shown in FIG. 4, memory 422 is coupled to the processing unit 421 by a bus 423. Memory 422 can be dynamic random access memory (DRAM) and can also include static random access memory (SRAM). A bus 423 couples processing unit 421 to the memory 422 and also to non-volatile storage 424 and to display controller 428 and to the input/output (I/O) controller 425. Display controller 428 controls in the conventional manner a display on a display device 429 which can be a cathode ray tube (CRT) or liquid crystal display (LCD). Input/output (I/O) controller 425 controls in the conventional manner input/output devices 426 that can include a keyboard, disk drives, printers, a scanner, and other input and output devices, including a mouse or other pointing device. The display controller 428 and the I/O controller 425 can be implemented with conventional well known technology. A Braille device 427 having a Braille display, may be coupled to an I/O controller 425 to provide a Braille code to a user. The user can provide an input using the input device, such as a keyboard, and receive a feedback from the screen of the display device 429 using the Braille device 427.

The non-volatile storage 424 is often a magnetic hard disk, an optical disk, or another form of storage for large amounts of data. Some of this data is often written, by a direct memory access process, into memory 422 during execution of software in the computer system 431. One of skill in the art will immediately recognize that the terms "computer-readable medium" and "machine-readable medium" include any type of storage device that is accessible by the processing unit 421.

It will be appreciated that computer system 431 is one example of many possible computer systems which have different architectures. For example, personal computers based on an Intel microprocessor often have multiple buses, one of which can be an input/output (I/O) bus for the peripherals and one that directly connects the processing unit 421 and the memory 422 (often referred to as a memory bus). The buses are connected together through bridge components that perform any necessary translation due to differing bus protocols.

Network computers are another type of computer system that can be used with the embodiments of the present invention. Network computers do not usually include a hard disk or other mass storage, and the executable programs are loaded from a network connection into the memory 422 for execution by the processing unit 421. A Web TV system, which is known in the art, is also considered to be a computer system according to the embodiments of the present invention, but it may lack some of the features shown in FIG. 4, such as certain input or output devices. A typical computer system will usually include at least a processor, memory, and a bus coupling the memory to the processor.

It will also be appreciated that the computer system 431 is controlled by operating system software, which includes a file management system, such as a disk operating system, which is part of the operating system software. One example of an operating system software is the family of operating systems known as Macintosh® Operating System (Mac OS®) or Mac OS X® from Apple Inc. of Cupertino, Calif. Another example of an operating system software is the family of operating systems known as Windows® from Microsoft Corporation of Redmond, Wash., and their associated file management systems. The file management system is typically stored in the non-volatile storage 424 and causes the processing unit 421 to execute the various acts required by the operating system to input and output data and to store data in memory, including storing files on the non-volatile storage 424.

Figure 15:
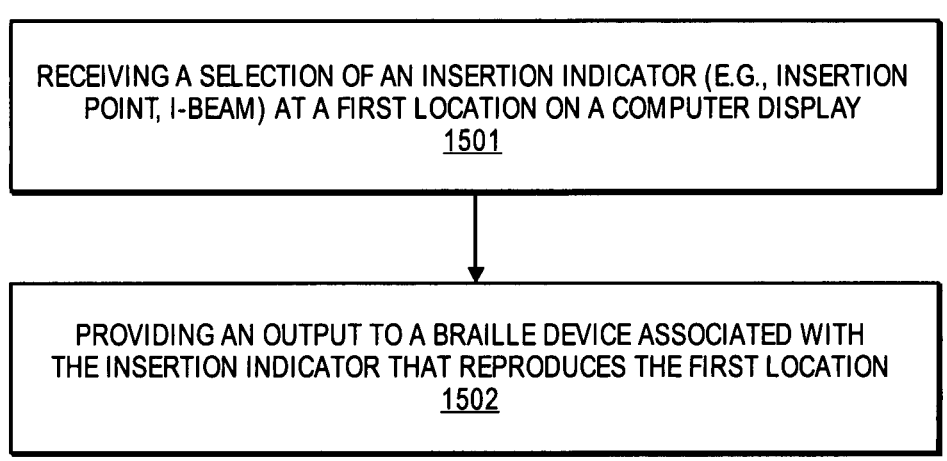
FIG. 15 shows a flowchart of one embodiment of a method to define an insertion indicator on a Braille device.

FIG. 15 shows a flowchart of one embodiment of a method 1500 to define an insertion indicator on a Braille device. Method begins with operation 1501 that involves receiving a selection of an insertion indicator at a first location on a display device, for example, a screen of a computer display. In one embodiment, information about an insertion indicator at the first location on the display device is received. Generally, the insertion indicator is an indicator for a point (location) where an input (for example, a user input) is inserted into a display device. The input may be inserted, for example, by positioning a pointing cursor and/or accessibility cursor to a location on the screen of a display device, such as display device 429 of FIG. 4, and pressing a mouse key, keyboard key, and the like. For example, the insertion indicator may point to a location on a display device to perform operations on items displayed on the display device, for example, to delete or insert one or more characters in a text. The insertion indicator may be, for example, an insertion point, an I-beam, a text cursor, and the like. In one embodiment, method 1500 is incorporated into a screen reader VoiceOver™ produced by Apple Inc., located in Cupertino, Calif.

Figure 5:
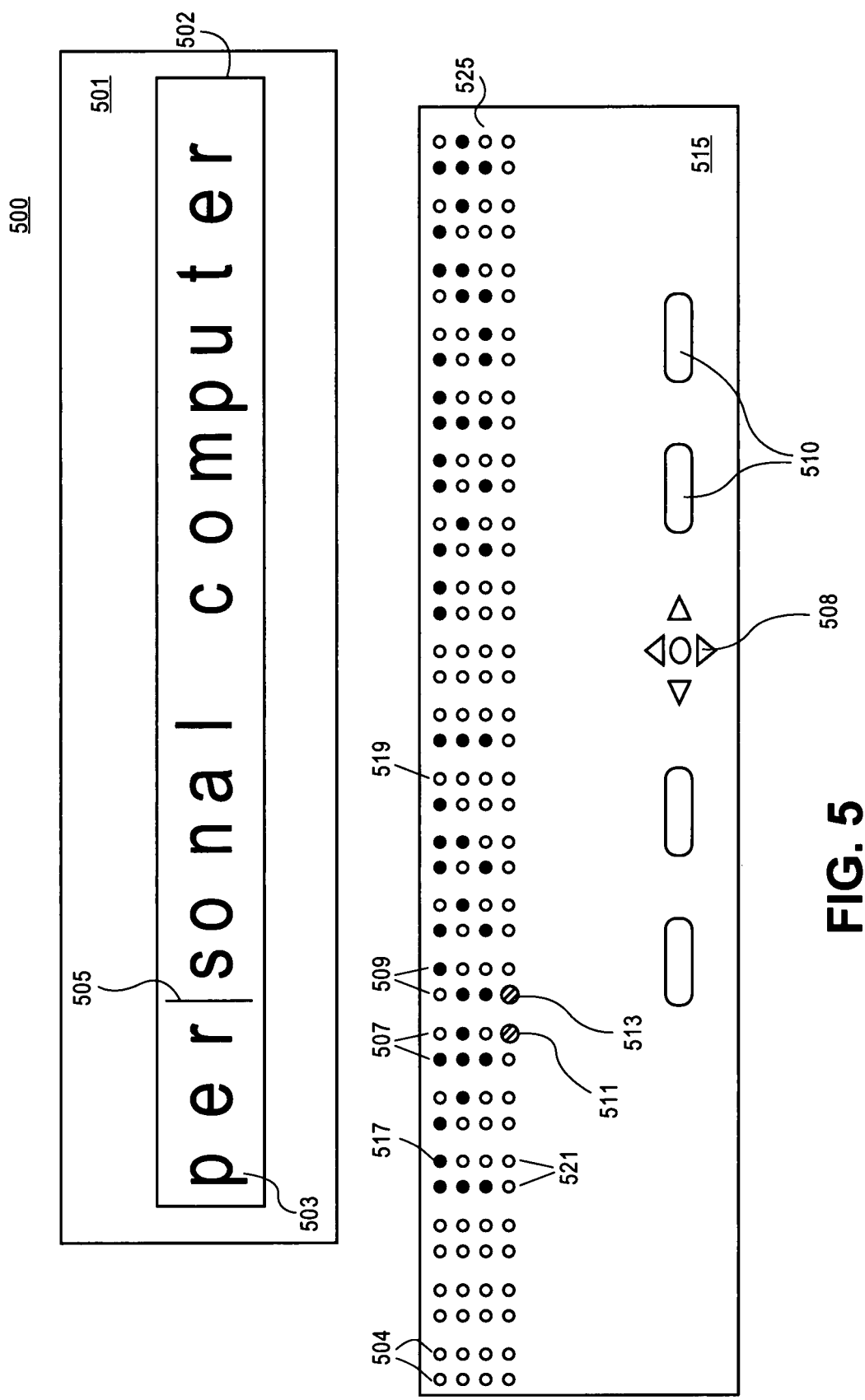
FIG. 5 shows one embodiment of a Braille device having a Braille code 525 that defines an insertion indicator.

FIG. 5 shows one embodiment of a Braille device 515 having a Braille code 525 that defines an insertion indicator 505 selected on a display device 501. As shown in FIG. 5, a text 503 "personal computer" is displayed on a screen of a display device 501. As shown in FIG. 5, insertion indicator 505, for example, a flashing I-beam, insertion point, a text cursor, is selected at a location between characters (e.g., letters) "r" and "s" on a display device. In one embodiment, an accessibility cursor 502, for example, in a shape of a box, may be positioned over text 503 to provide an output for a user with a visual disability, as described in a co-pending U.S. patent application Ser. No. 10/956,720, filed Oct. 1, 2004, which is incorporated herein by reference in its entirety. In one embodiment, text 503 selected by accessibility cursor 502, is converted to the Braille code to provide an output to Braille device 515. In one embodiment, accessibility cursor 502 and insertion indicator 505 are tethered together. That is, accessibility cursor 502 may follow insertion indicator 505, and/or vise versa that causes a Braille code displayed on Braille device 515 to follow insertion indicator 505. For example, when the insertion indicator moves down or up to another line of the text, the Braille code 525 is updated to show the line of text that the insertion indicator is on. In one embodiment, insertion indicator 505 goes into effect when accessibility cursor 502 is positioned over a text area, such as text 503, and when a user starts to interact with text 503. In one embodiment, when the user starts to interact with text 503, accessibility cursor 502 moves word-to-word, sentence-to-sentence, paragraph-to-paragraph along the text area, such as text 503.

Figure 14:
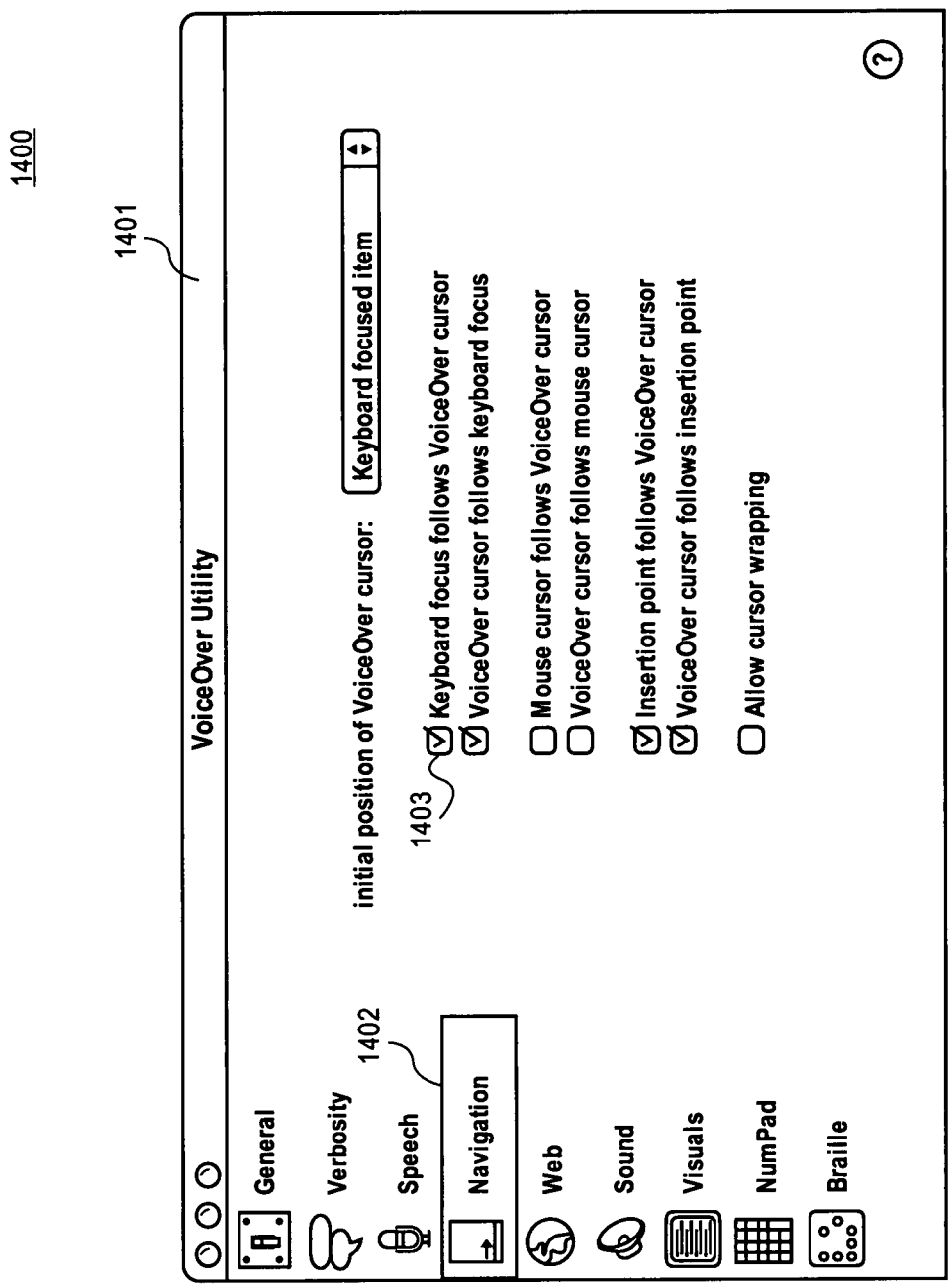
FIG. 14 shows on embodiment of a user interface to provide cursor tethering options.

FIG. 14 shows on embodiment of a user interface to provide cursor tethering options. As shown in FIG. 14, the user interface displays a window 1401 with one or more user interface ("UI") elements. In one embodiment, window 1401 is a VoiceOver™ Utility window. The screen reader VoiceOver™ is produced by Apple Inc., located in Cupertino, Calif. As shown in FIG. 14, menu item "Navigation" is opened to display various tethering options, such as an option 1403 for a user to choose from. As shown in FIG. 14, the cursor tethering allows a user to tie together any combination of various cursors, e.g., an arrow cursor, insertion indicator, such as an insertion point, keyboard focus, and accessibility cursor, such as a VoiceOver™ cursor. For example, the accessibility cursor may follow the keyboard focus that may follow the insertion indicator, and vice versa, such that when the accessibility cursor moves, the insertion indicator moves, and when the insertion indicator moves, the accessibility cursor moves. As shown in FIG. 14, various tethering options may be turned "on" or "off" for example, by checking the appropriate check box.

Referring back to FIG. 15, method 1500 continues with operation 1502 that involves providing an output associated with the insertion indicator to a Braille device that reproduces the first location in response to receiving the information about the insertion indicator at the first location, as described in further detail below. In one embodiment, the output is provided to at least two Braille cells of the Braille device, as described in further detail below. In one embodiment, a Braille caption panel is displayed on the display device, wherein the Braille caption panel includes a simulation of the output associated with the insertion indicator on the Braille device, as described in further detail below with respect to FIGS. 10-13.

As shown in FIG. 5, a Braille device 515 has Braille cells, such as a cell 521, a cell 507, and a cell 509, to display a Braille code 525. As shown in FIG. 5, each Braille cell has 8 dots. Dots may be raised, such as a black dot 517, and lowered ("flush"), such as a white dot 519. The dots may be raised or lowered depending on the output signal, for example, from a processing unit, such as processing unit 421 provided to the Braille device, such as Braille device 427 depicted in FIG. 4. As shown in FIG. 5, Braille code 525 represents text 503 and insertion indicator 505 on Braille device 515. As shown in FIG. 5, one or more raised dots of each Braille cell, such as cell 521, may represent one character (e.g., a letter, spacing, and the like) displayed on display device 501. Insertion indicator 505 is located between the characters, as shown in FIG. 5. There is nothing between the Braille cells on a display of a Braille device 515 to convey directly the current location of the insertion indicator 505. To solve this, dot 8 (511) from a Braille cell 507 and dot 7 (513) from a Braille cell 509 are used to denote the current location (e.g., between letters "r" and "s") of insertion indicator 505 on display device 501. Braille cell 507 corresponds to a location of a character on display device 501 that precedes insertion indicator 505. As shown in FIG. 5, dots 1-6 of Braille cell 507 are used to display a Braille code of a character that precedes (immediately to the left of) insertion indicator 505 on display device 501, such as letter "r" of text 503. Braille cell 509 corresponds to a location of a character on display device 501 that follows insertion indicator 505.

As shown in FIG. 5, dots 1-6 of Braille cell 509 are used to display a Braille code of a character that follows (immediately to the right of) insertion indicator 505 on display device 501, such as letter "s" of text 503. Defining the insertion indicator by straddling across two Braille cells, such as cells 507 and 509, correctly conveys to the user with the impaired vision that the insertion indicator 505 is between the two characters represented by Braille cells 507 and 509 respectively. As such, the user can feel with fingers the two characters, such as "r" and "s", represented by Braille cells, such as cells 507 and 509, that reproduces to the user the actual position of the insertion indicator 505 between these two characters. With such definition of the insertion indicator, it is immediately clear to the user with the impaired vision, where a new character and/or text will be inserted when the user starts typing and/or pasting. That is, the user with the impaired vision will be able to receive from a Braille device, such as Braille device 515, exactly the same information as a sighted user receives from a display device, such as display device 501. In one embodiment, each of a dot 8 (511) of Braille cell 507 and dot 7 (513) of Braille cell 509 on Braille device 515 is pulsed (raised and lowered) to reproduce location of insertion indicator 505 that flashes on display device 501. In one embodiment, dot 8 (511) and dot 7 (513) are raised for about 0.5 second, and lowered for about 0.5 second in a cycle pattern. That is, the output to the Braille device 515 is provided that reflects the actual location of the insertion indicator 505 on the display device 501 and accurately describes what a sighted user sees on the display device 501. Therefore, a user with an impaired vision can know exactly where the input (e.g., a user input) is inserted on display device 501. This may be very helpful in a collaborative environment, as described in further detail below.

As shown in FIG. 5, Braille device 515 has control elements for a user with impaired vision to navigate a screen of the display device 501. The control elements of the Braille device may be router buttons (not shown), directional controls 508, and/or any other interface elements, such as miscellaneous keys 510. In one embodiment, Braille device 515 has one or more additional cells, such as a status cell 504, to convey additional information about what is provided on display device 501. In one embodiment, the status cells, such as cell 504, indicate whether an announcement appears on display device 501. In another embodiment, the status cells, such as cell 504, indicate one or more text attributes. For example, the status cells may indicate a font, whether or not the text is contracted, bold, shadowed, and/or capitalized.

Figure 6:
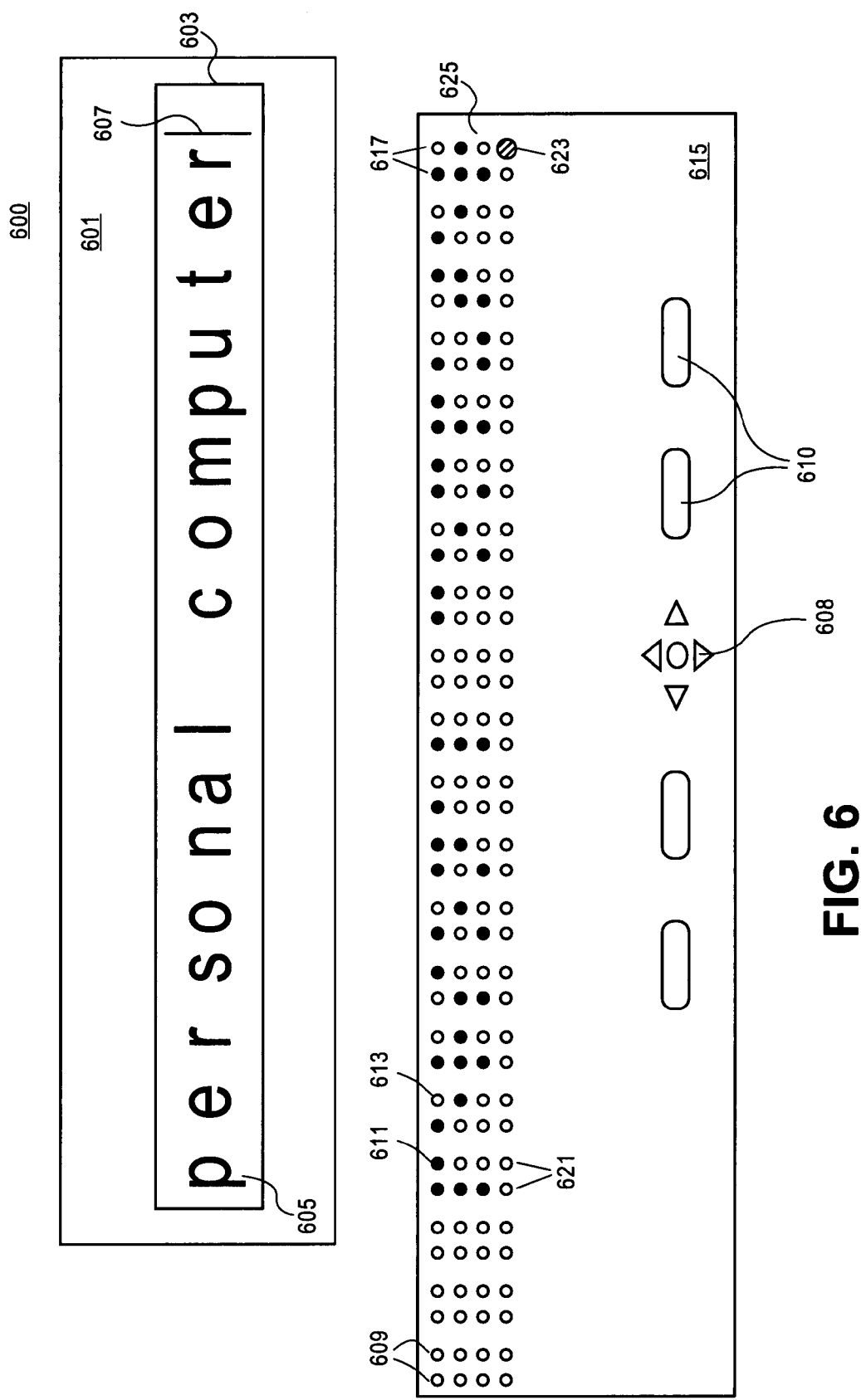
FIG. 6 shows a view similar to FIG. 5, after positioning an insertion indicator at another location on a display device.

FIG. 6 shows a view similar to FIG. 5, after positioning an insertion indicator at another location on a display device 601. As shown in FIG. 6, insertion indicator 607, for example, a flashing I-beam, insertion point, a text cursor, is moved to an end of a text 605 location on a screen of a display device 601. In one embodiment, an accessibility cursor 603, for example, in a shape of a box, may be positioned over text 605 to provide an output to Braille device 615, as described above.

As shown in FIG. 6, Braille device 615 has Braille cells, such as a cell 621 and a cell 617, to display a Braille code. As shown in FIG. 6, each Braille cell has 8 dots. Dots may be raised, such as a black dot 611, and lowered ("flush"), such as a white dot 613, as described above. As shown in FIG. 6, a Braille code 625 represents text 605 and insertion indicator 607 on Braille device 615. As shown in FIG. 6, a dot 8 (623) from a Braille cell 617 is used to denote the current location (e.g., at the end of text 605) of insertion indicator 607 on display device 601. Braille cell 617 corresponds to a location of a character on display device 601 that precedes insertion indicator 607. As shown in FIG. 6, dots 1-6 of Braille cell 617 are used to display a Braille code of a character that precedes (immediately to the left of) insertion indicator 607 on display device 601, such as a last character of text 503 (e.g., letter "r"). This correctly conveys to the user with the impaired vision that the insertion indicator 607 is at the end of the text 607. In one embodiment, dot 8 (623) of Braille cell 617 is pulsed (raised and lowered) to reproduce location of insertion indicator 607 that flashes on display device 601.

As shown in FIG. 6, Braille device 615 has control elements for a user with impaired vision to navigate a screen of the display device 601. The control elements of the Braille device may be router buttons (not shown), directional controls 608, and/or any other interface elements, such as miscellaneous keys 610. In one embodiment, Braille device 615 has one or more status cells, such as a status cell 609, as described above.

Figure 7:
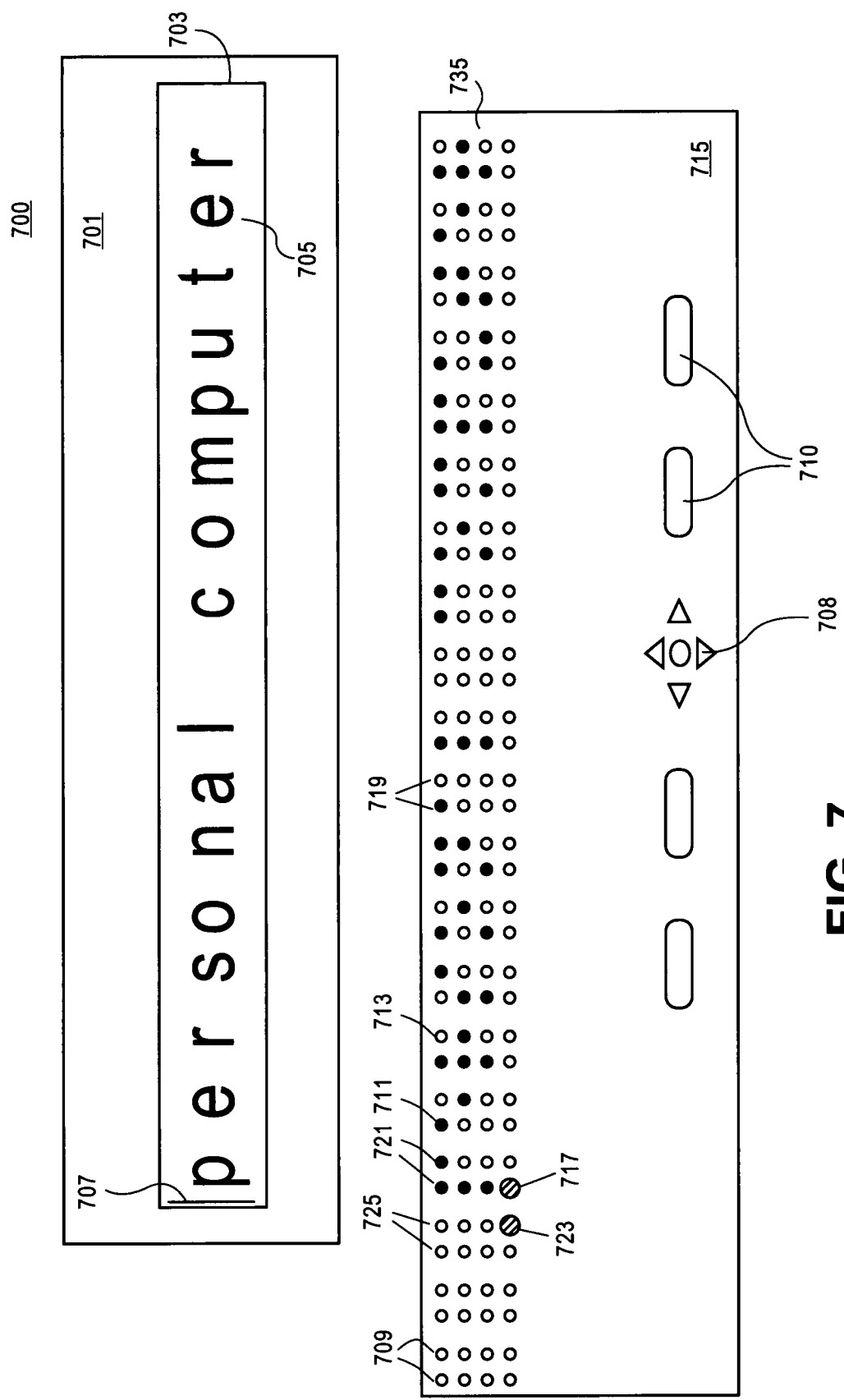
FIG. 7 shows a view similar to FIG. 6, after positioning an insertion indicator at yet another location on a display device.

FIG. 7 shows a view similar to FIG. 6, after positioning an insertion indicator at yet another location on a display device. As shown in FIG. 7, insertion indicator 707, for example, a flashing I-beam, insertion point, a text cursor, is moved to a beginning of a text 705 location on a screen of a display device 701. In one embodiment, an accessibility cursor 703 is positioned over text 705 to provide an output to Braille device 715, as described above.

As shown in FIG. 7, Braille device 715 has Braille cells, such as a cell 719 and a cell 721, to display a Braille code. As shown in FIG. 7, each Braille cell has 8 dots. Dots may be raised, such as a black dot 711, and lowered ("flush"), such as a white dot 713, as described above. As shown in FIG. 7, a Braille code 735 represents text 705 and insertion indicator 707 on Braille device 715. In one embodiment, a dot 7 (717) from a Braille cell 721 is used to denote the current location (e.g., at the beginning of text 705) of insertion indicator 707 on display device 701. Braille cell 721 corresponds to a location of a character on display device 701 that follows insertion indicator 707. As shown in FIG. 7, dots 1-6 of Braille cell 721 are used to display a Braille code of a character that follows (immediately to the right of) insertion indicator 707 on display device 701, such as a first character of text 705 (e.g., letter "p"). In one embodiment, dot 7 (717) of Braille cell 721 is pulsed (raised and lowered) to reproduce location of insertion indicator 707 that flashes on display device 701.

As shown in FIG. 7, Braille device 715 has one or more additional cells, as described above. The additional cells may be one or more status cells, such as a cell 709, and one or more unused (blank) Braille cells, such as a cell 725. In one embodiment, dot 8 of mostly unused Braille cell, such as cell 725, that separates one or more status cells from the used Braille cell, such as Braille cell 721, is used to define insertion indicator 707. In one embodiment, both dot 7 (717) from a Braille cell 721 and dot 8 (723) from cell 725 are used to denote the current location (e.g., at the beginning of text 707) of insertion indicator 707 on display device 701. Cell 725 is located before (immediately to the left of) Braille cell 721, which corresponds to a location of a character on display device 701 that follows insertion indicator 707 (e.g., letter "p"). This accurately conveys to the user with the impaired vision that the actual location of insertion indicator 707 is at the beginning of the text 705. In one embodiment, dot 7 (717) of Braille cell 721 and dot 8 (723) from cell 725 are pulsed (raised and lowered) to reproduce location of insertion indicator 707 that flashes on display device 701. As shown in FIG. 7, Braille device 715 has control elements, such as controls 708 and 710, for a user with impaired vision to navigate a screen of the display device 701, as described above.

Figure 8:
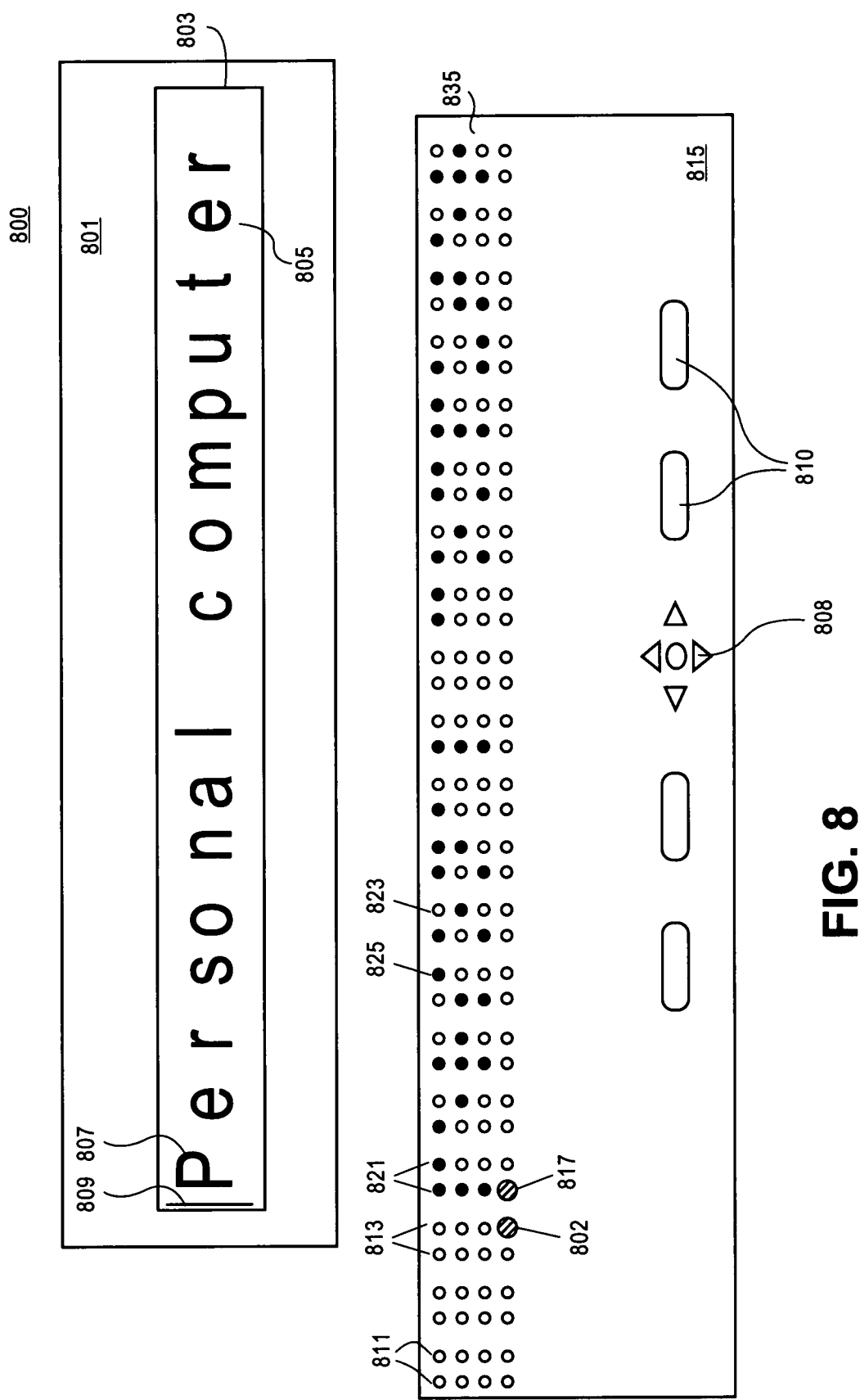
FIG. 8 shows a view similar to FIG. 7, after positioning an insertion indicator at yet another location on a display device.

FIG. 8 shows a view similar to FIG. 7, after positioning an insertion indicator at yet another location on a display device. As shown in FIG. 8, insertion indicator 809, for example, a flashing I-beam, insertion point, a text cursor, is moved to a location on a screen of a display device 801 that is before a capital letter. In one embodiment, an accessibility cursor 803 is positioned over text 805 to provide an output to Braille device 815, as described above. As shown in FIG. 8, Braille device 815 has Braille cells, such as a cell 821, to display a Braille code 835, and control elements, such as controls 808 and 810, for a user with impaired vision to navigate a screen of the display device 801, as described above.

As shown in FIG. 8, each Braille cell has 8 dots. Dots may be raised, such as a black dot 825, and lowered ("flush"), such as a white dot 823, as described above. As shown in FIG. 8, Braille code 835 represents text 805 and insertion indicator 809. As shown in FIG. 8, Braille device 815 has one or more status cells, such as a cell 811 and a cell 813, as described above. In one embodiment, dot 8 (802) from the cell that corresponds to the location preceding the insertion indicator 809 and dot 7 (817) from the cell that corresponds to the location that follows the insertion indicator are used to denote the current location (e.g.; before the capital letter) of insertion indicator 809 on display device 801. As shown in FIG. 8, cell 813 corresponds to the location before (immediately to the left of) the insertion indicator 809 and cell 821 corresponds to the location that follows (immediately to the right of) insertion indicator 809. In one embodiment, dot 802 is pulsed (raised and lowered), while dot 817 remains raised, to reproduce position of flashed insertion indicator 809 before a capital letter. In another embodiment, dot 802 pulses with one cycle pattern and dot 817 pulses with another cycle pattern. For example, dot 817 may remain raised until a substantially short period of time, e.g., for about a tenth of a second, before dot 802 is fully raised, then dot 817 will remain raised while dot 802 is lowered. Then, dot 802 may remain lowered until a substantially short period of time (for example, a tenth of a second) before raising. In one embodiment, dot 802 is raised for about 0.9 second, and lowered for about 0.1 second, while dot 817 remains raised. In yet another embodiment, the pulsing behavior of dot 7 (817) of cell 821 that corresponds to a character (e.g., capital letter "P") that follows the insertion point 809 overrides the raised behavior of cell 821. That is, both dot 8 (802) of the previous cell 813 and dot 7 (817) of the following cell 821 may pulse on the Braille device 815.

Figure 9:
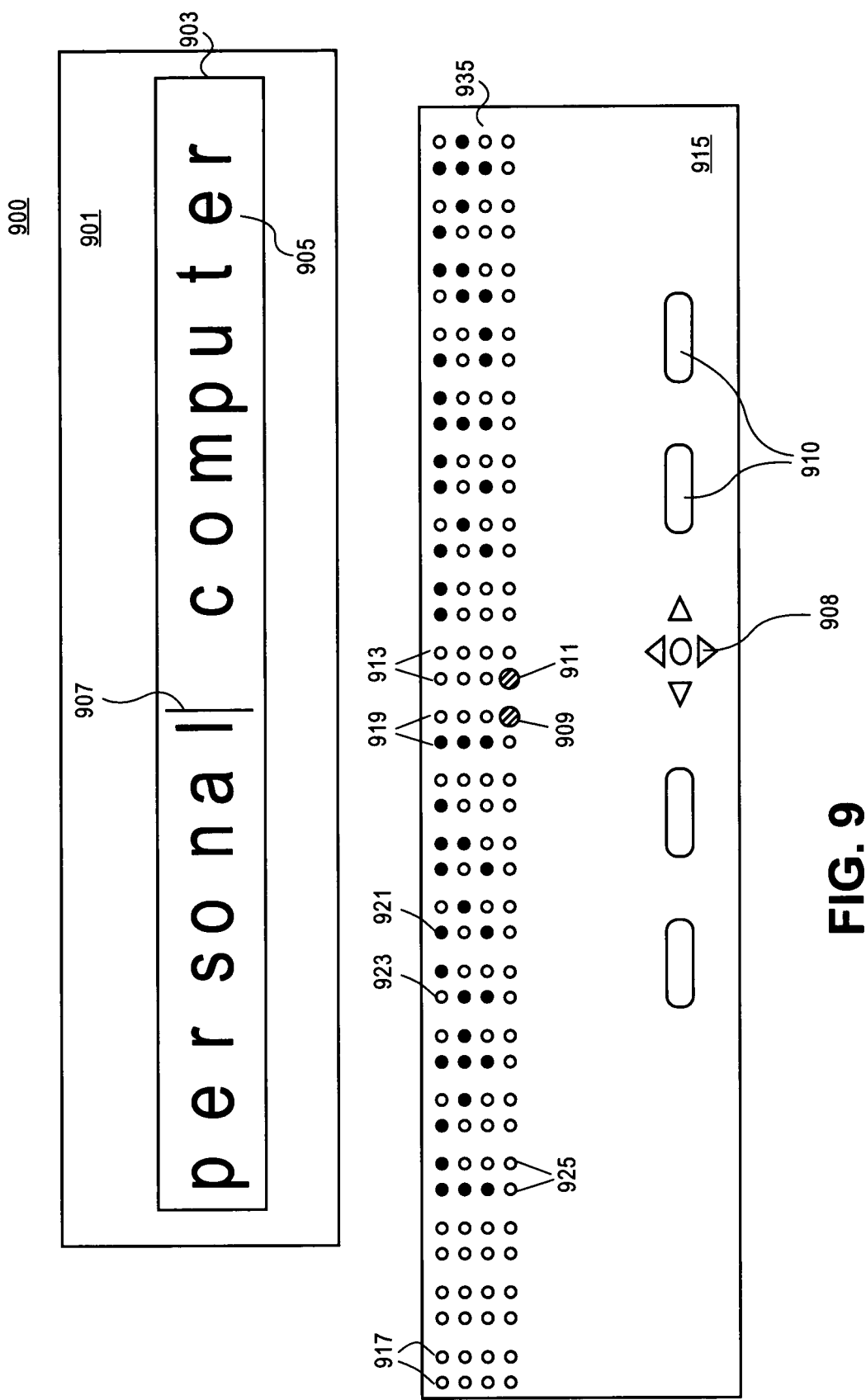
FIG. 9 shows a view similar to FIG. 8, after positioning an insertion indicator at yet another location on a display device.

FIG. 9 shows a view similar to FIG. 8, after positioning an insertion indicator at yet another location on a display device. As shown in FIG. 9, insertion indicator 907, for example, a flashing I-beam, insertion point, a text cursor, is moved to a location on a screen of a display device 901 at a spacing that separates two words. As shown in FIG. 9, an accessibility cursor 903 is positioned over text 905 to provide an output to Braille device 915, as described above. As shown in FIG. 9, Braille device 915 has Braille cells, such as a cell 925, a cell 919, and a cell 913, to display a Braille code 935, and control elements, such as controls 908 and 910, for a user with impaired vision to navigate a screen of the display device 901, as described above. In one embodiment, Braille device 915 has one or more status cells, such as a cell 917, as described above.

As shown in FIG. 9, each Braille cell has 8 dots. Dots may be raised, such as a black dot 921, and lowered ("flush"), such as a white dot 923, as described above. As shown in FIG. 9, Braille code 935 represents text 905 and insertion indicator 907. In one embodiment, dot 8 (909) from the cell that corresponds to the location preceding the insertion indicator 907 and dot 7 (911) from the cell that corresponds to the location that follows the insertion indicator are used to denote the current location (e.g. at the spacing) of insertion indicator 907 on display device 901. As shown in FIG. 9, cell 919 represents a character that precedes (immediately to the left of) the insertion indicator 907 (letter "l") and cell 913 represents a spacing that follows (immediately to the right of) insertion indicator 907. In one embodiment, dots 909 and 911 are pulsed (raised and lowered) to reproduce the position of the flashed insertion indicator 907.

Figure 16:
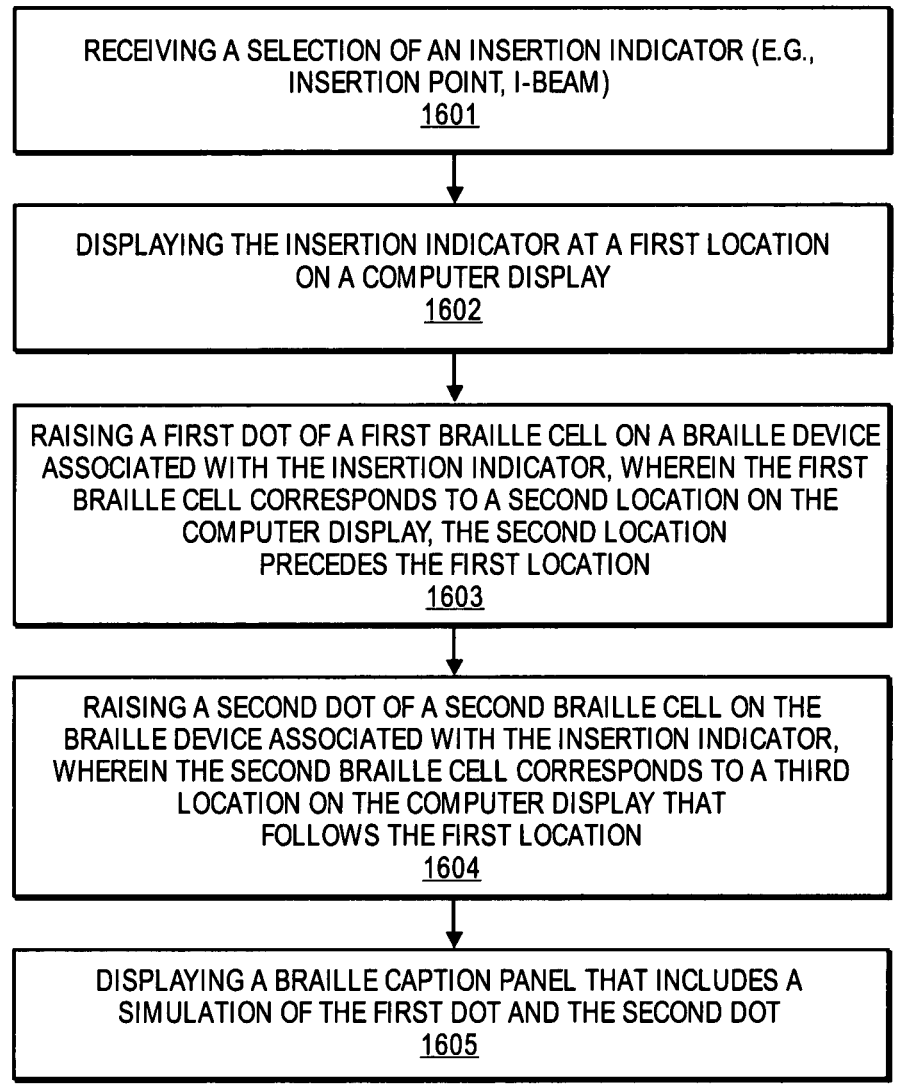
FIG. 16 shows a flowchart of another embodiment of a method to define an insertion indicator on a Braille device.

FIG. 16 shows a flowchart of another embodiment of a method 1600 to define an insertion indicator on a Braille device. Method begins with receiving a selection of an insertion indicator (e.g., an insertion point, an I-beam, a text cursor, and the like) at operation 1601. In one embodiment, information about the insertion indicator is received. Receiving the information about the insertion indicator may include selecting the insertion indicator, for example, by positioning a pointing cursor and/or accessibility cursor to a location on a screen of a display device, such as display device 429 of FIG. 4, and pressing a mouse key, keyboard key, and the like. Method continues with optional operation 1602 that involves displaying the insertion indicator at a first location on a display device, for example, a screen of a computer monitor, as described above with respect to FIGS. 5-9. At operation 1603, an output associated with the insertion indicator is provided to raise a first dot (e.g., dot 8) of a first Braille cell on the Braille device, wherein the first Braille cell corresponds to the location that precedes (immediately to the left of) the location of the insertion indicator on a screen of the display device, as described above with respect to FIGS. 5-9. At operation 1604, an output associated with the insertion indicator is provided to raise a second dot (e.g., dot 7) of a second Braille cell on the Braille device, wherein the second Braille cell corresponds to the location that follows (immediately to the right of) the location of the insertion indicator on a screen of the display device, as described above with respect to FIGS. 5-9. A Braille caption panel that includes a first simulation of the first dot and/or a second simulation of the second dot is displayed on the screen of the display device at operation 1605, as described in further detail below. In one embodiment, method 1600 is incorporated into a screen reader VoiceOver™ produced by Apple Inc., located in Cupertino, Calif.

Figure 10:
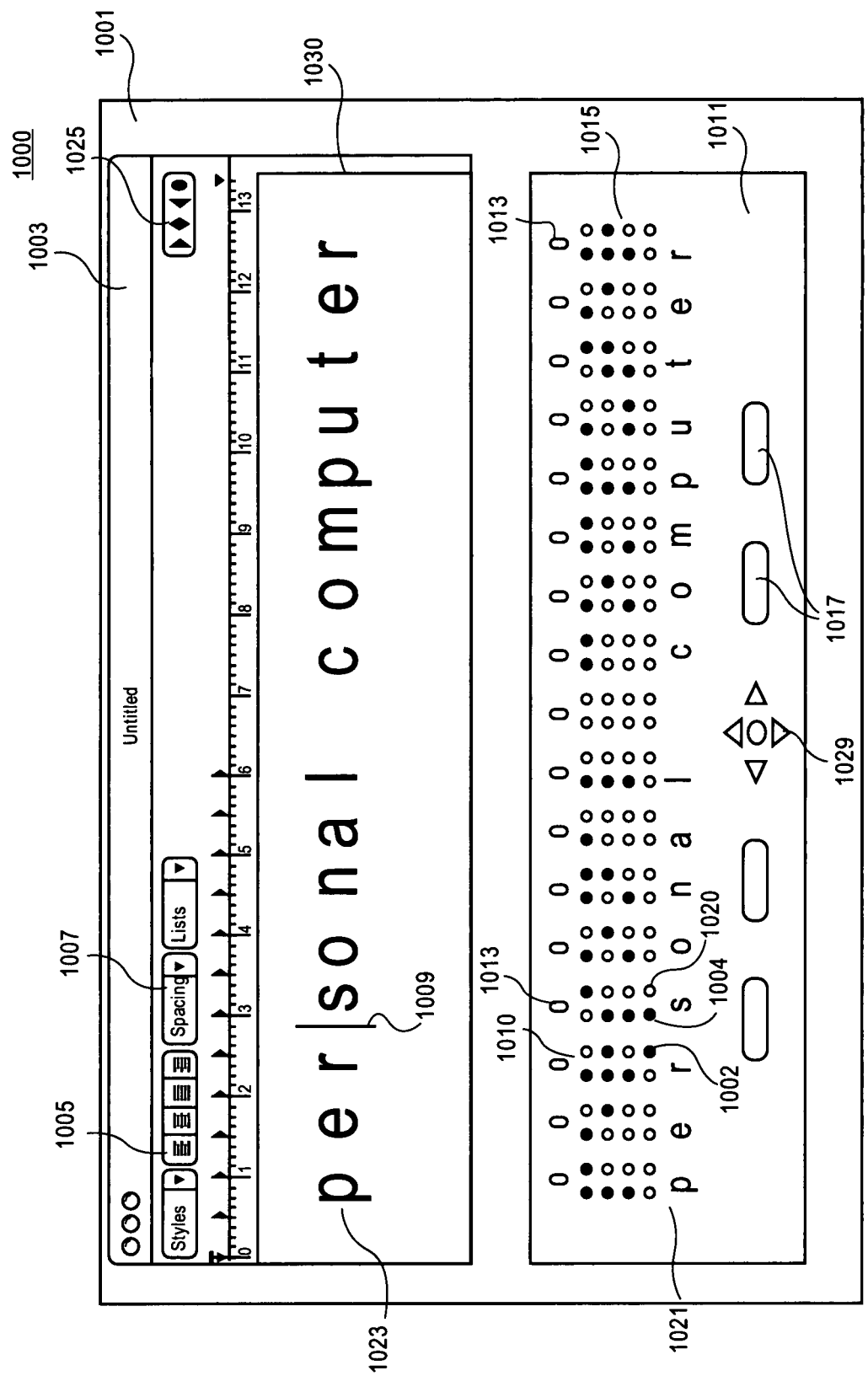
FIG. 10 illustrates one embodiment of a user interface with a Braille caption panel that includes a simulation of the output to a Braille device that defines an insertion indicator.

FIG. 10 illustrates one embodiment of a user interface with a Braille caption panel that includes a simulation of the output to a Braille device that defines an insertion indicator. As shown in FIG. 10, the user interface includes an application window 1003 and a Braille support caption panel 1011 that are displayed on a screen of a display device 1001. Application window 1003 has controls 1005, 1007, and 1025 for a user to interact with, and a text 1023, as shown in FIG. 10. An accessibility cursor 1030 may be placed over text 1023. In one embodiment, text 1023 selected by accessibility cursor 1030, is converted to a Braille code to provide an output to the Braille device, as described above.

As shown in FIG. 10, a Braille caption panel 1011 includes a simulation 1015 of a Braille code ("virtual Braille code"), and a text 1021. Simulation 1015 may represent a Braille code, such as Braille code 525, displayed on a Braille device, such as Braille device 515, depicted in FIG. 5. As shown in FIG. 10, text 1021 is placed centered underneath of corresponding Braille code 1015. Text 1021 represents an original, pre-translated text 1023 that has been transcribed to Braille code 1015, as described in greater detail in a co-pending U.S. patent application Ser. No. 11/760,758, filed Jun. 9, 2007, which is incorporated herein by reference in its entirety. In one embodiment, Braille caption panel 1011 includes a simulation of one or more items presented on the Braille device, such as a Braille device depicted in FIGS. 4-9. In one embodiment, an accessibility cursor caption panel (not shown) is displayed on display device 1001. In one embodiment, the accessibility cursor caption panel (not shown) shows the text that corresponds to a spoken text that describes the items pointed by the accessibility cursor.

As shown in FIG. 10, Braille text 1015 includes a plurality of virtual dots that simulate dots of cells on the display of the Braille device. As shown in FIG. 10, each virtual cell, such as a cell 1010 has 8 virtual dots. As shown in FIG. 10, virtual dots that simulate the raised dots on the Braille device may be marked, and the virtual dots that simulate the lowered dots on the Braille device may be unmarked. Braille caption panel 1011 includes a simulation 1002 of a dot 8 of the Braille cell that represents a character that precedes the insertion indicator 1009 and a simulation 1004 of a dot 7 of the Braille cell that represents a character that follows the insertion indicator 1009, as shown in FIG. 10.

A virtual dot 8 (1002) from a virtual Braille cell 1010 and virtual dot 7 (1004) from a virtual Braille cell 1020 denote the current location (e.g., between letters "r" and "s") of insertion indicator 1009. As shown in FIG. 10, virtual Braille cells 1010 and 1013 may simulate Braille cells 507 and 509 depicted in FIG. 5, respectively. In one embodiment, each of the virtual dots 1002 and 1004 flash to simulate pulsing dots 511 and 513 respectively.

For existing systems, it is very difficult for a user with impaired vision to follow where a sighted user types or going to insert a new character/text. With the definition of the insertion indicator and a Braille caption panel, as described herein, it is easy in a collaborative environment for the user with impaired vision to feel the position of the insertion indicator as the sighted user sees it, and vice versa.

In one embodiment, Braille caption panel 1011 is placed on the top of the screen of the display device over all windows; e.g., window 1003. As shown in FIG. 10, Braille caption panel 1011 includes one or more virtual control elements; e.g., virtual router buttons (e.g., a router button 1013), virtual directional keys 1029, and virtual miscellaneous keys 1017. In one embodiment, selecting a virtual control element of Braille caption panel 1011 by using, for example, a mouse, simulates pressing the respective physical control element of the Braille device using, for example, a finger. In one embodiment, selecting virtual router button 1013 above the virtual Braille cell that represents a letter "s" can move an insertion indicator 1009 before (immediately to the left of) letter "s" in application window 1003.

That is, Braille caption panel 1011 having a simulation of the output to the Braille device associated with the insertion indicator allows a sighted user who does not know the Braille code to collaborate seamlessly with a user having a visual disability using the same computer. The simulation of the output to the Braille device associated with the insertion indicator Braille caption panel 1011 allows the sighted user to see what the blind user receives (e.g., feels) on the display on the Braille device. Using the Braille caption panel 1011 the sighted user (e.g., a teacher) can provide a feedback to a user with a visual disability (e.g., a student) to increase the efficiency of navigation on the screen of the computer display.

Figure 11:
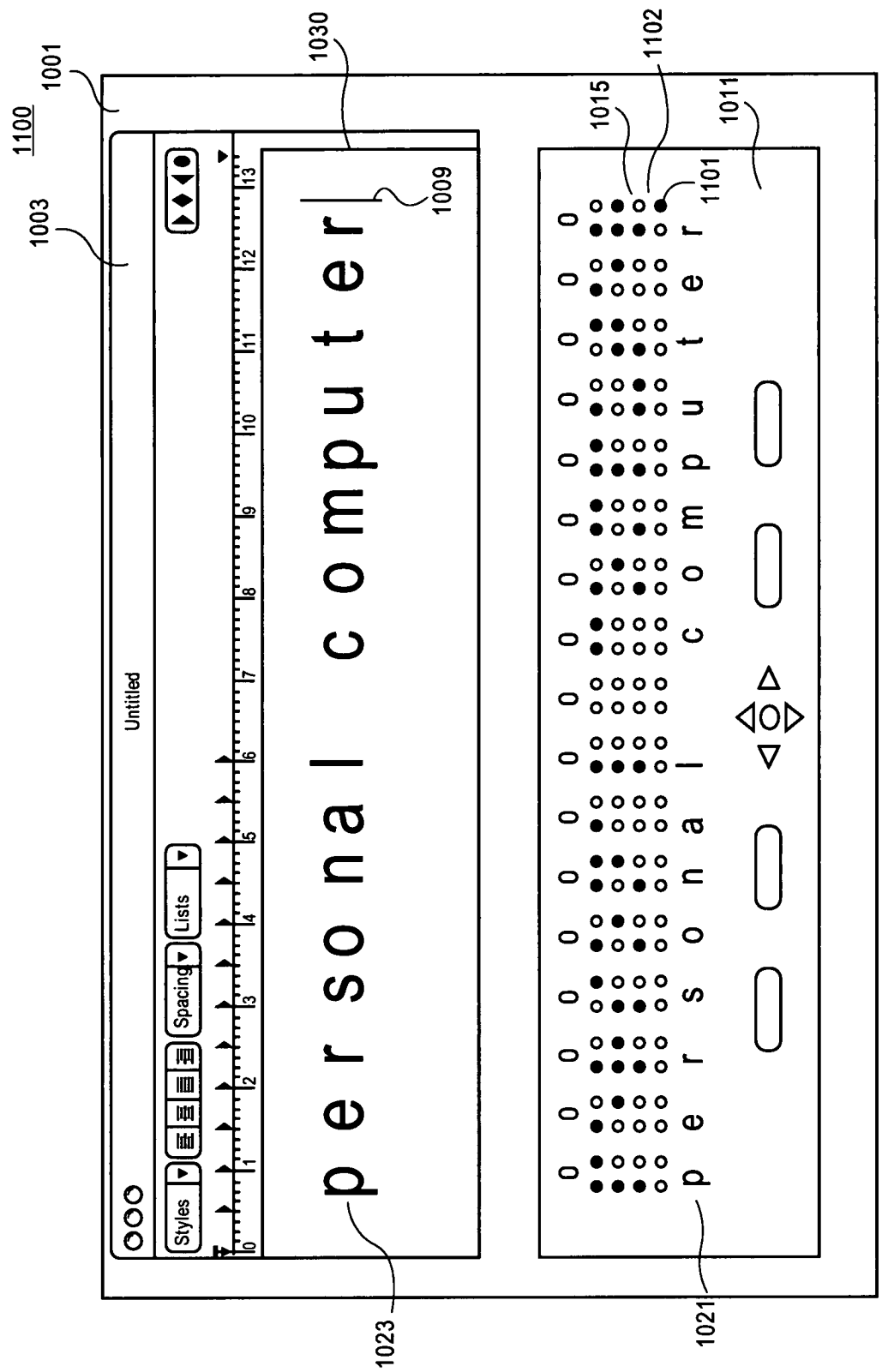
FIG. 11 is a view similar to FIG. 10, after positioning an insertion indicator at another location on a display device.

FIG. 11 is a view similar to FIG. 10, after moving insertion indicator 1009 to another location on a display device, for example, to the end of a text 1023. As shown in FIG. 11, a Braille caption panel 1011 includes a simulation 1015 of a Braille code ("virtual Braille code"), and a text 1021, as described above. Braille caption panel 1011 includes a simulation 1101 of a dot 8 of a Braille cell 1102 that represents a character that precedes the insertion indicator 1009 (letter "r"), as shown in FIG. 11.

A virtual dot 8 (1101) from a virtual Braille cell 1102 denote the current location (at the end of the text 1023) of insertion indicator 1009. As shown in FIG. 11, virtual Braille cell 1102 may simulate Braille cell 617 depicted in FIG. 6. In one embodiment, virtual dot 1102 flashes to simulate pulsing dot 623 depicted in FIG. 6.

Figure 12:
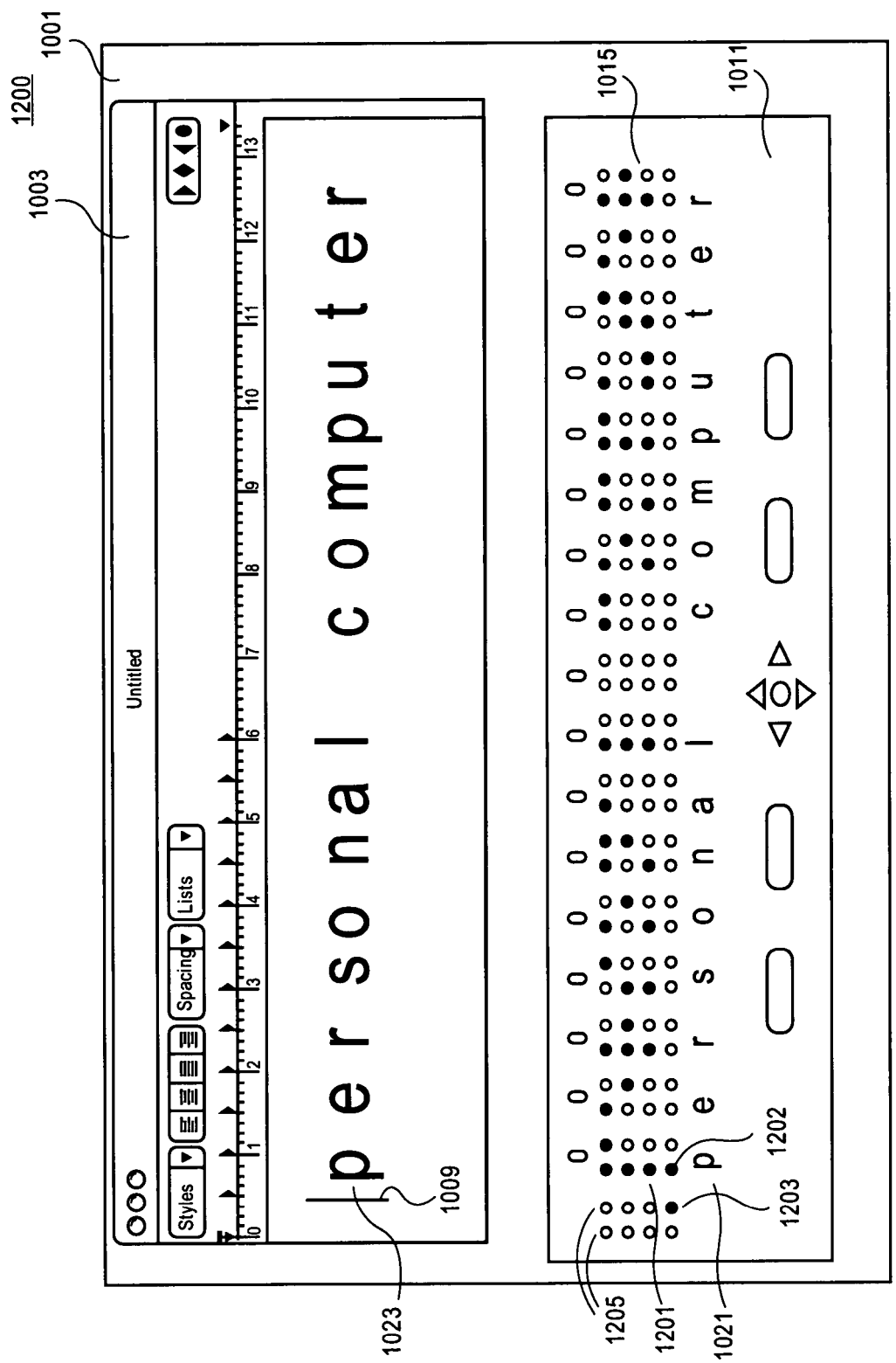
FIG. 12 is a view similar to FIG. 11, after positioning an insertion indicator at yet another location on a display device.

FIG. 12 is a view similar to FIG. 11, after moving insertion indicator 1009 to yet another location on a display device, for example, to the beginning of a text 1023. As shown in FIG. 12, a Braille caption panel 1011 includes a simulation 1202 of a dot 8 (virtual dot 8) of a Braille cell 1201 that represents a character that follows the insertion indicator 1009 (letter "p"). In one embodiment, Braille caption panel 1011 includes a simulation of one or more status cells (e.g., a virtual status cell 1205). As shown in FIG. 12, virtual dot 8 1203 from virtual status cell 1205 and virtual dot 7 (1202) from a virtual Braille cell 1201 denote the current location (at the beginning of the text 1023) of insertion indicator 1009. Virtual cells 1205 and 1202 may simulate Braille cells 725 and 721 respectively, as depicted in FIG. 7. In one embodiment, virtual dots 1203 and 1202 flash to respectively simulate pulsing dots 723 and 717 depicted in FIG. 7.

In one embodiment, when insertion indicator 1009 is placed at a capital letter on a display device (not shown), a virtual dot from a virtual cell that represents a capital letter (not shown) does not flash while remaining marked in Braille panel 1011 to simulate a respective dot on the Braille device, as described with respect to FIG. 8.

Figure 13:
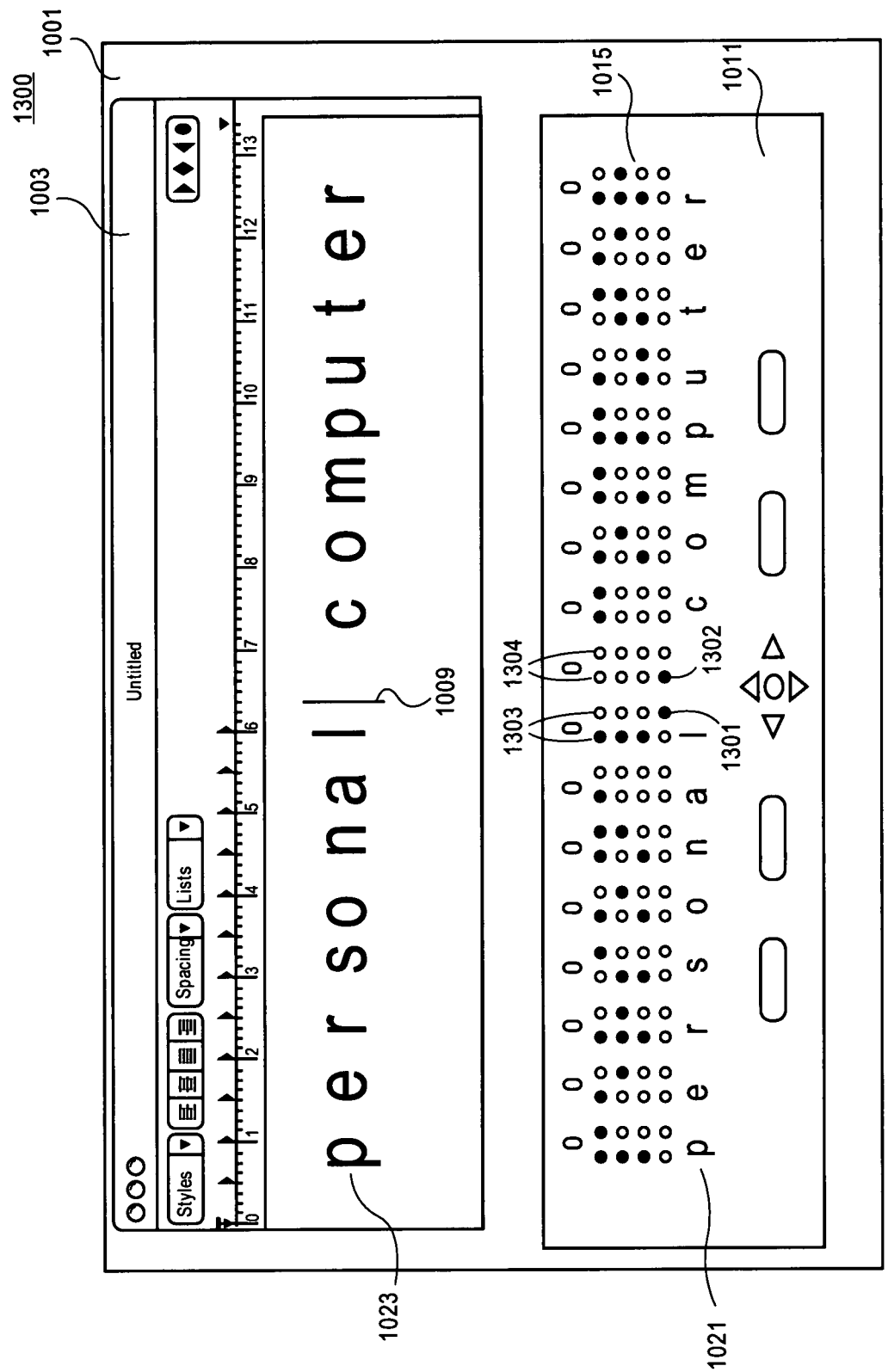
FIG. 13 is a view similar to FIG. 12, after positioning an insertion indicator at yet another location on a display device.

FIG. 13 is a view similar to FIG. 12, after moving insertion indicator 1009 to yet another location on a display device, for example, to a spacing between two words of a text 1023. As shown in FIG. 13, a Braille caption panel 1011 includes a simulation 1301 of a dot 8 (virtual dot 8) of a virtual Braille cell 1303 that represents a character (letter "l") that precedes the insertion indicator 1009 and a simulation 1302 of a dot 7 (virtual dot 7) of a virtual Braille cell 1304 that represents a spacing that follows the insertion indicator 1009. As shown in FIG. 12, the virtual dot 8 from virtual Braille cell 1303 and the virtual dot 7 from virtual Braille cell 1304 denote the current location (at the spacing) of insertion indicator 1009. Virtual cells 1303 and 1304 may simulate Braille cells 919 and 913 respectively, as depicted in FIG. 9. In one embodiment, virtual dots 1303 and 1304 flash to respectively simulate pulsing dots 909 and 911 depicted in FIG. 9.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A method of reproducing a location of an insertion indicator on a Braille device having a plurality of Braille cells, each of the plurality of Braille cells including Braille dots 1-6 to represent a character and Braille dots 7-8 to convey additional information, the method comprising:
    receiving information on a processor about the insertion indicator at a first location that is between a first and a second adjacent characters displayed on a display device; and
    providing an output associated with the insertion indicator from the processor to the Braille device, wherein the output causes the Braille device to reproduce the location of the insertion indicator by raising exactly one dot from Braille dots 7-8 in each of two adjacent Braille cells that correspond to the first and the second adjacent characters such that the two raised dots are adjacent one another.

2. The method of claim 1, further comprising:
    displaying a Braille caption panel on the display device, the Braille caption panel includes a simulation of the Braille device that allows a sighted user to see what is displayed on the Braille device including the output associated with the insertion indicator.

3. A method to define an insertion indicator on a Braille device having a plurality of Braille cells, each of the plurality of Braille cells including Braille dots 1-6 to represent a character and Braille dots 7-8 to convey additional information, the method comprising:
    receiving information on a processor about the insertion indicator at a location that is between a first and a second adjacent characters displayed on a display device;
    providing an output associated with the insertion indicator from the processor to a first Braille cell in which Braille dots 1-6 correspond to the first character on the Braille device, the output to raise exactly one dot from Braille dots 7-8 of the first Braille cell; and
    providing the output associated with the insertion indicator from the processor to a second Braille cell adjacent to the first Braille cell in which Braille dots 1-6 of the second Braille cell correspond to the second character on the Braille device, the output to raise exactly one dot from Braille dots 7-8 of the second Braille cell such that the two raised dots from Braille dots 7-8 of the first and the second Braille cells are adjacent one another.

4. The method of claim 3, further comprising
    displaying a Braille caption panel that includes a simulation of Braille cells associated with the insertion indicator that allows a sighted user to see what is displayed on the Braille device.

5. A non-transitory machine-readable medium containing executable program instructions which cause a data processing system to perform operations comprising:
- receiving information about an insertion indicator at a first location that is between a first and a second adjacent characters displayed on a display device; and
- providing an output associated with the insertion indicator to a Braille device having a plurality of Braille cells, each of the plurality of Braille cells including Braille dots 1-6 to represent a character and Braille dots 7-8 to convey additional information, wherein the output causes the Braille device to reproduce the first location of the insertion indicator by raising exactly one dot from Braille dots 7-8 in each of two adjacent Braille cells that correspond to the first and the second adjacent characters such that the two raised dots are adjacent one another.

6. The non-transitory machine-readable medium of claim 5, further including data that cause the data processing system to perform operations comprising
- displaying a Braille caption panel on the display device, the Braille caption panel includes a simulation of the Braille device that allows a sighted user to see what is displayed on the Braille device including the output associated with the insertion indicator on the Braille device.

7. A non-transitory machine-readable medium containing executable program instructions which cause a data processing system to perform operations to define an insertion indicator on a Braille device having a plurality of Braille cells, each of the plurality of Braille cells including Braille dots 1-6 to represent a character and Braille dots 7-8 to convey additional information, the operations comprising:
- receiving information about the insertion indicator at a first location that is between a first and a second adjacent characters displayed on a display device;
- providing an output associated with the insertion indicator to a first Braille cell in which Braille dots 1-6 correspond to the first character on the Braille device, the output to raise exactly one dot from Braille dots 7-8 of the first Braille cell; and
- providing the output associated with the insertion indicator to a second Braille cell adjacent to the first Braille cell in which Braille dots 1-6 of the second Braille cell correspond to the second character on the Braille device, the output to raise exactly one dot from Braille dots 7-8 of the second Braille cell such that the two raised dots from Braille dots 7-8 of the first and the second Braille cells are adjacent one another.

8. The non-transitory machine-readable medium of claim 7, further including data that cause the data processing system to perform operations comprising
- displaying a Braille caption panel that includes a simulation of Braille cells associated with the insertion indicator that allows a sighted user to see what is displayed on the Braille device.

9. A data processing system, comprising:
- a processor;
- a Braille device coupled to the processor, the Braille device having a plurality of Braille cells, each of the plurality of Braille cells including Braille dots 1-6 to represent a character and Braille dots 7-8 to convey additional information; and
- a display device coupled to the processor,
- wherein the processor is configured to receive a location of an insertion indicator that is between a first and a second adjacent characters displayed on the display device and to provide an output associated with the location of the insertion indicator to the Braille device, wherein the output causes the Braille device to reproduce the location of the insertion indicator by raising exactly one dot from Braille dots 7-8 in each of two adjacent Braille cells that correspond to the first and the second adjacent characters such that the two raised dots are adjacent one another.

10. The data processing system of claim 9, wherein the processor is further configured to display a Braille caption panel on the display device, the Braille caption panel includes a simulation of the output associated with the insertion indicator on the Braille indicator that allows a sighted user to see what is displayed on the Braille device.

* * * * *